United States Patent

Massie, II et al.

[11] Patent Number: 5,386,860
[45] Date of Patent: Feb. 7, 1995

[54] CUT RESISTANT TIRE

[75] Inventors: Johnny D. Massie, II, Lexington, Ky.; Paul W. Hobart, Wadsworth, Ohio; Jerry Malin, Akron, Ohio; Richard H. Reisinger, North Canton, Ohio

[73] Assignee: The Goodyear Tire & Rubber Company, Akron, Ohio

[21] Appl. No.: 71,898

[22] Filed: Jun. 3, 1993

Related U.S. Application Data

[63] Continuation-in-part of Ser. No. 964,229, Oct. 21, 1992.

[51] Int. Cl.6 .............. B60C 9/00; B60C 9/18; B60C 9/20
[52] U.S. Cl. .................................. 152/198; 152/451; 152/526; 152/527; 152/555
[58] Field of Search ............. 152/193, 195, 198, 202, 152/451, 526–527, 563, DIG. 14, 548, 550–551, 555–561; 156/96; 139/425 R

[56] References Cited

U.S. PATENT DOCUMENTS

| | | | |
|---|---|---|---|
| 2,609,026 | 9/1952 | Luchsinger-Caballero | 156/129 X |
| 2,874,742 | 2/1959 | Lugli | 152/526 X |
| 3,108,628 | 10/1963 | Kraft | 152/551 |
| 3,897,814 | 8/1975 | Graney | 152/527 X |
| 4,106,957 | 8/1978 | Tournoy | 152/451 X |
| 4,347,290 | 8/1982 | Haemers | 152/565 X |

Primary Examiner—Michael W. Ball
Assistant Examiner—Adrienne C. Johnstone
Attorney, Agent, or Firm—David E. Wheeler

[57] ABSTRACT

A cut resistant pneumatic tire is provided. The tire has a monofilament wire structure embedded in or under its tread or sidewall, and is used in off the road applications such as mining. The monofilament wire has a diameter of 0.4 to 1.2 mm and is made of brass plated steel. The wire may be woven or may have a spring link configuration. Two monofilament wires may be twisted together, and when two such wires are used, the total diameter is 0.8 to 1.4 mm.

5 Claims, 6 Drawing Sheets

CUT RESISTANT TIRE

This application is a continuation-in-part of application Ser. No. 07/964,229 filed Oct. 21, 1992.

BACKGROUND OF THE INVENTION

The invention relates to cut resistant pneumatic tires, especially off-the-road tires and heavy duty off-the-road tires having typically 1 to 36 carcass plies and 6 belts (in a radial ply tire) or 4 breakers (in a bias ply tire), and one to four sets of beads.

Heavy duty off-the-road tires, because of the nature of their use, are exposed to cutting and delamination caused by sharp rocks and uneven terrain. In the prior art, this problem was sometimes addressed by including wire fragments embedded in the rubber of the tread and sidewalls of such tires. Although shredded wire has been tried to prevent cut growth, it does not work well, and may be relatively expensive (brass coated wire works best), and is very difficult to handle and process into rubber. Shredded wire tends to jam the processing equipment and causes accelerated wear of the processing equipment.

This problem was addressed in U.S. patent application Ser. No. 07/600,380, now U.S. Pat. No. 5,173,136, issued Dec. 22, 1992, by incorporating RFL coated monofilament fibers into the tread rubber and sidewall rubber of mining tires.

It is an object of the present invention to provide a cut resistant tire, which is easier to process and to build than a tire reinforced with shredded wire.

Other objects of the invention will be apparent from the following specification and claims.

PRIOR ART

U.S. Pat. No. 122,249 to Brandenburger relates to a tire having a carcass comprising a chained structure which interlocks both beads of the tire. The rings of the chain are made of spring steel wire and the construction is described as being armor or a metallic fabric.

U.S. Pat. No. 1,143,265 to Gautier relates to armoring pneumatic tires, and describes a structure similar to a bicycle chain comprising the carcass reinforcement of the tire.

U.S. Pat. No. 1,201,257 to Cobb relates to a fabric for tires in which longitudinal wire cords or filaments are interwoven with organic fibers. The structure described is used in a crown area of the tire as a belt structure.

U.S. Pat. No. 1,207,709 to Campbell relates to fabric for tires in which wire is interwoven with organic cords or fibers in a wire/organic composite structure.

U.S. Pat. No. 1,228,650 to Christian relates to a pneumatic tire in which a woven wire fabric is used in the crown area and upper sidewall of the tire. The woven wire structure is said to provide resistance against perforation, lines 17-18, and blowouts resulting from high internal pneumatic pressure, and from injury termed "stone bruise" lines 27-30.

U.S. Pat. No. 1,236,227 to Stewart relates to an armored tire structure which comprises a series of interconnected rings which also interconnect with the beads of the tire. The rings are described in the specification as being a series of chains disposed transversely within the body of the shoe.

U.S. Pat. No. 1,271,388 to Taylor relates to a tire shoe or casing which comprises metal strands, preferably woven together.

U.S. Pat. No. 1,365,208 to Sacks relates to a tire casing which comprises a circumferentially endless knitted fabric. The fabric is said to be flexible wire at column 1, line 51.

U.S. Pat. No. 1,602,870 to Villiers relates to a sheet material for covering, lining, or closing constructions of all kinds, particularly bomb-proof awnings. The structure comprises woven wire in a rubber composite.

U.S. Pat. No. 2,987,095 to Toulmin, Jr. relates to a tire cord structure and describes a tire wherein reinforcing metal is incorporated and thoroughly united with the rubber in the body of the casing. The individual strands may be woven to provide a fabric structure or interwoven middle layer, column 2, lines 43-45.

U.S. Pat. No. 4,235,274 to Suzuki et al, relates to a tire structure having a reinforcing layer composed of a helically formed filament or bundle of wire in the crown area of the tire. According to the claims, the bundle comprises at least two filaments and in use in a tire, it appears that five to seven filaments comprise the bundle used.

SUMMARY OF THE INVENTION

A cut resistant pneumatic tire is provided which comprises at least a pair of parallel annular beads, carcass plies comprising parallel cord reinforcement wrapped around the beads, a tread disposed radially over the carcass plies in a crown area of the tire, and sidewalls disposed radially over the carcass plies between the tread and the beads. The tires may be bias ply or radial ply construction.

The improvement in the tire comprises the inclusion of continuous monofilament wire having a diameter of 0.4 to 1.2 mm in or radially under the tread and/or sidewall. The monofilament wire may be woven or may comprise linked springs. Two monofilament wires may be used together, and in such an embodiment, the combined diameter of the wires is 0.8 to 1.4 mm.

In the illustrated embodiment where the wire is woven, wires in the "weft" direction may have the same diameter as wires in the "warp" direction, and such wires may be fused at their point of intersection. In a preferred embodiment, the wires in the warp and the weft directions are free so that they may pantograph during the building of the tire.

In an alternative embodiment, the wires are coiled into springs and the springs are linked together so that a coil of each spring overlaps with a coil of an adjacent spring.

The wire may also be formed in ring structures and chain structures.

DETAILED DESCRIPTION OF THE INVENTION

Figure 1:
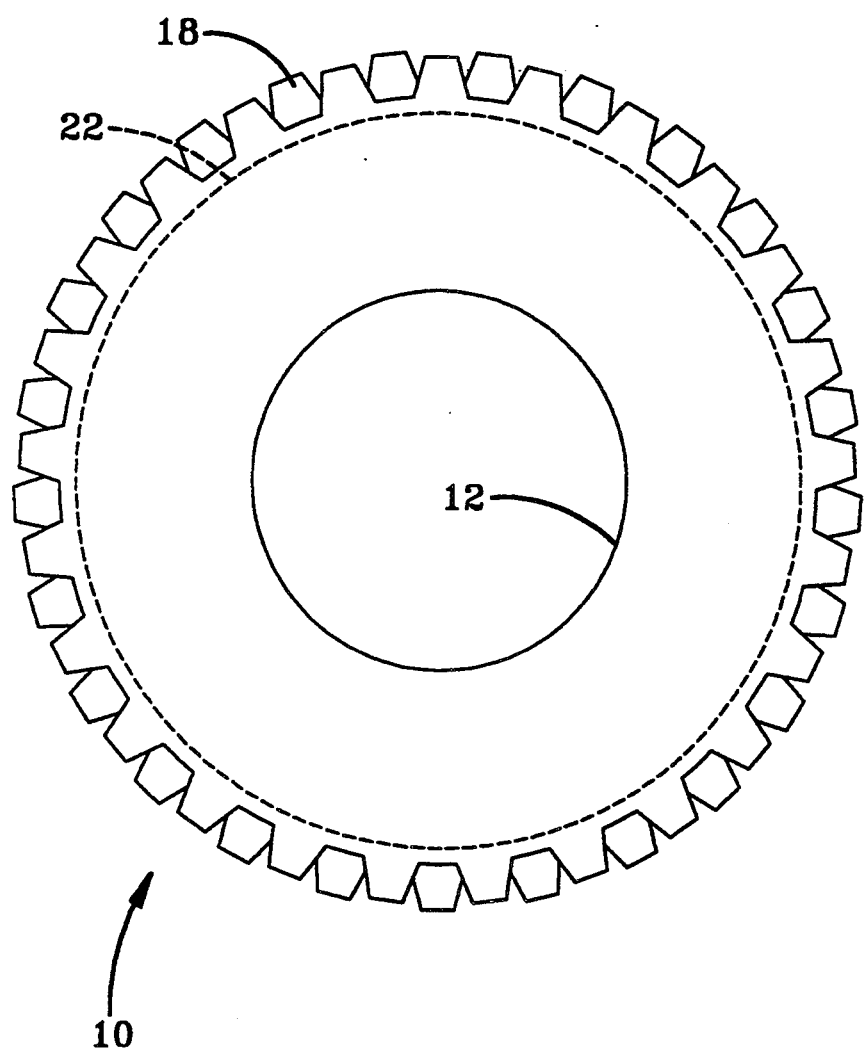
FIG. 1 illustrates a heavy duty off-the-road radial tire having a wire filament structure embedded therein.
Figure 1A:
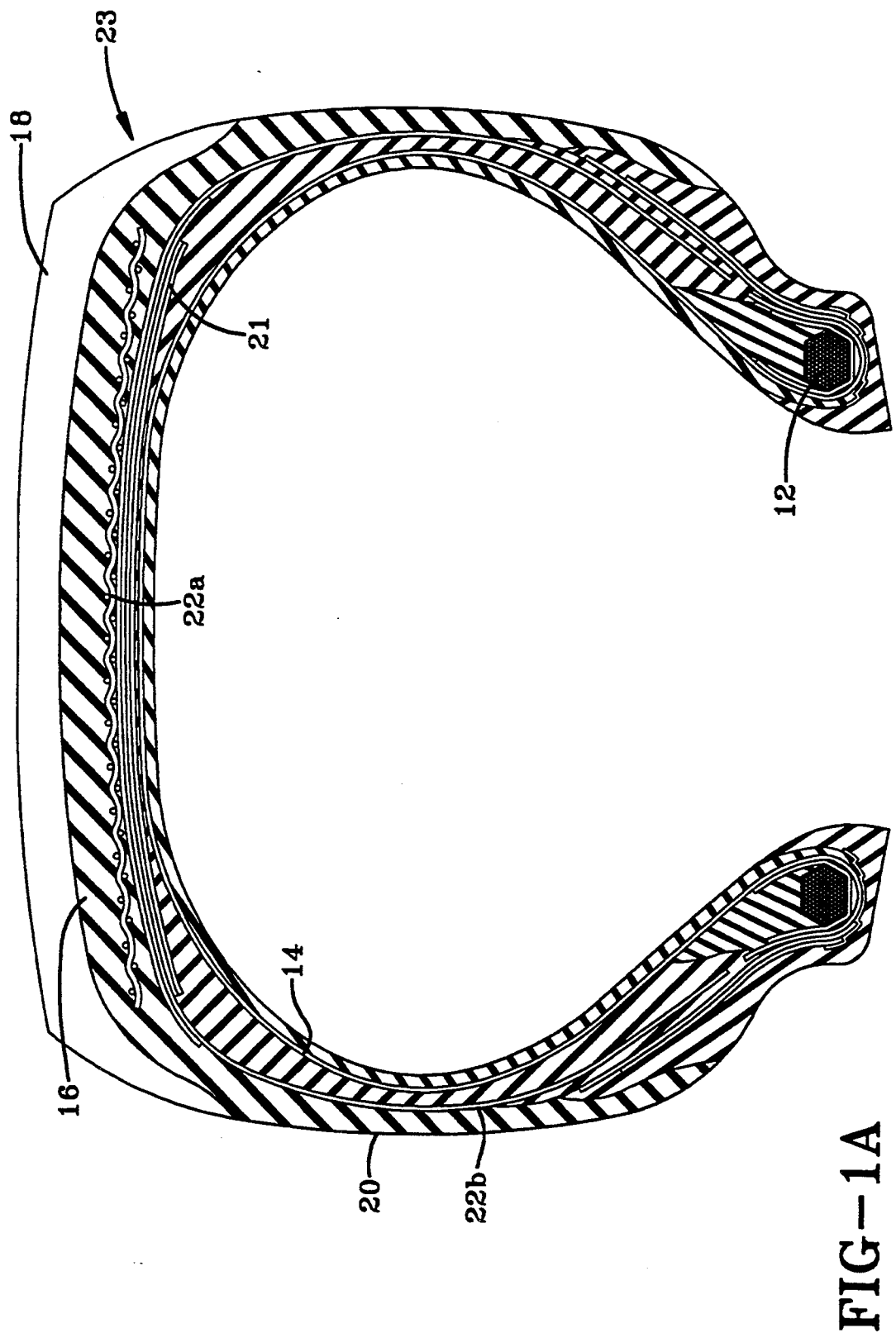
FIG. 1A illustrates a cross section of a radial ply tire having woven monofilament wire embedded therein.
Figure 1B:
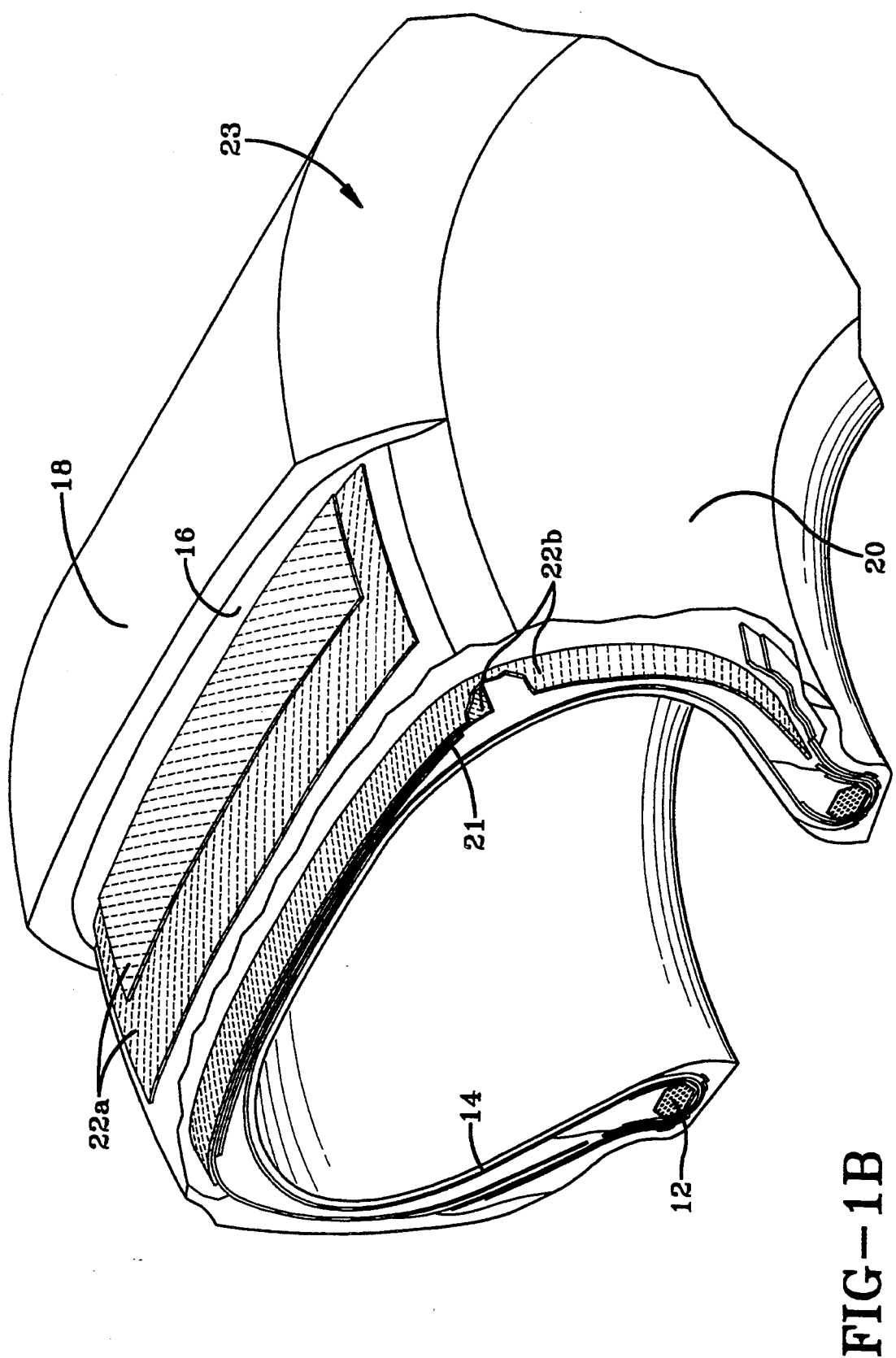
FIG. 1B illustrates a perspective cut-away view to illustrate the independence of nonwoven wires in separate layers in a radial ply tire.
Figure 2:
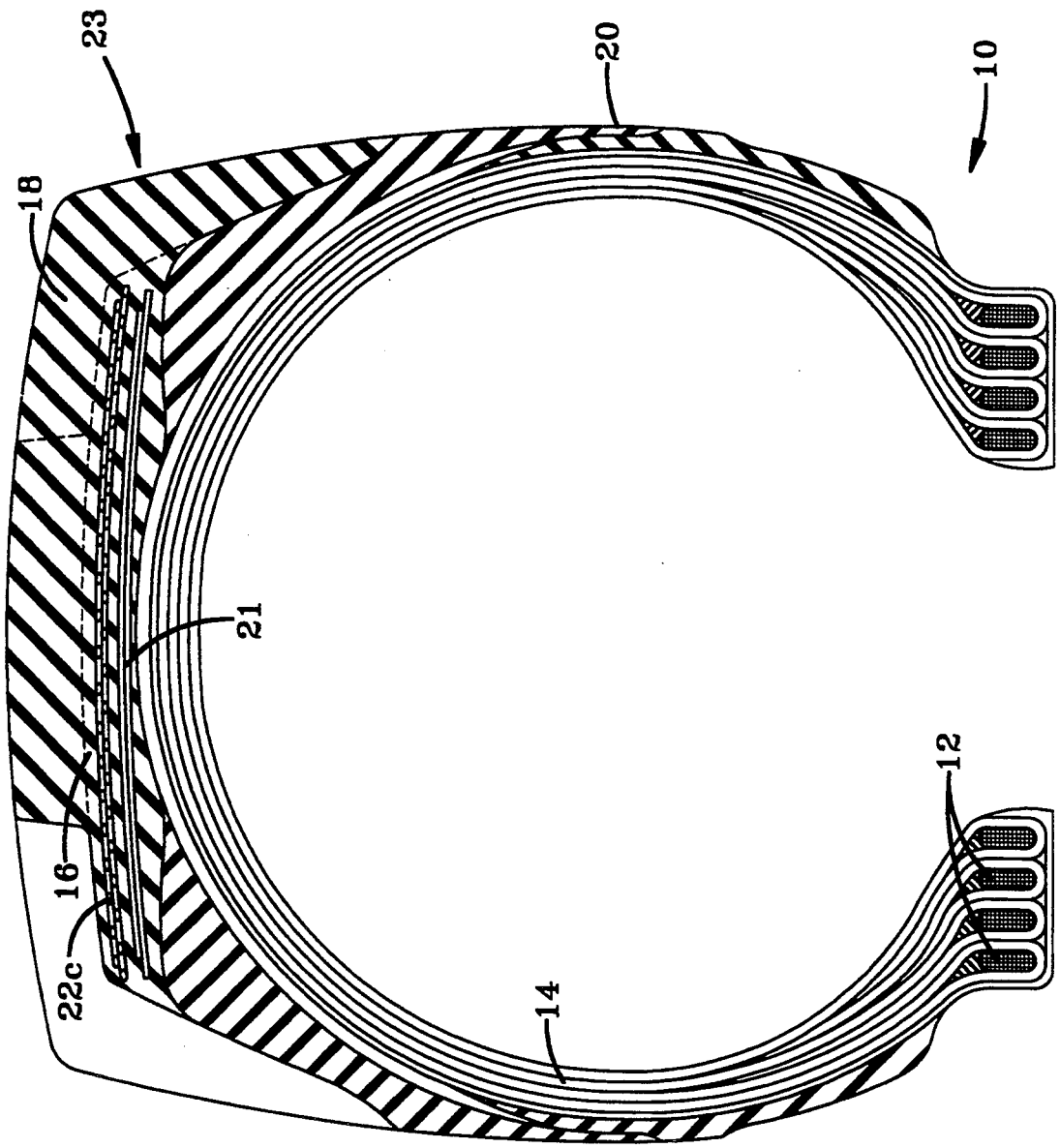
FIG. 2 illustrates a cross section of a bias ply tire having nonwoven monofilament wire embedded therein.

With reference now to FIGS. 1, 1A, 1B and 2, embodiments of a heavy duty, off-the-road tire 10 of the invention are illustrated. The tire comprises beads 12, carcass plies 14 wrapped around beads 12, tread base 16 disposed radially over carcass plies 14 in a crown area of tire 10, tread 18 disposed radially over tread base 16, and sidewalls 20 disposed between the tread and beads 12. Wire 22 is embedded in or radially under the tread and/or the sidewall 20. FIG. 1 represents a radial tire having one set of beads, and FIG. 2 represents a bias ply tire having four sets of beads.

In the illustrated embodiment, wire 22 has a diameter of 0.4 to 1.2 mm and is made of brass coated steel. The tensile strength of the wire used is 1300 to 3500 MPa, preferably 1350 to 3250 MPa. The elongation at break of the brass coated wire, before incorporation in an armor structure, was 2 to 8%. Those skilled in the art will recognize that the structure of the wire, especially when a spring structure is used, will significantly increase the potential elongation. Examples of monofilament steel wire which can be used in the invention are 1040c steel wire with a tensile strength of 1365 MPa, and 1092c steel wire with a tensile strength of 1820 MPa. As used in the illustrated embodiments, the wire was preformed into its desired structure by Justesen Industries, 1090 Yew Ave., Elaine, Wash. 98230, and by National Standard, Corbin, Ky. 40701.

Continuous lengths of wire are used in various components of the tire. As used herein, continuous wire means wire of a length at least sufficient to (continuously) span the treadwidth or sidewall width (or both together) of the tire, or to form a chain link or similar structure; as opposed to shredded wire.

The wire can be used in the tire at an end count of, theoretically, 2 to 30 epi (end per inch), although end counts of 3 to 10 epi are believed sufficient. In the illustrated embodiments, end counts of 3 to 6 epi are preferred, and in two preferred embodiments 3 and 4 epi were used, to provide the proper rivet as well as the strength and penetration resistance required.

The wire is brass plated or coated using conventional techniques.

Figure 3:
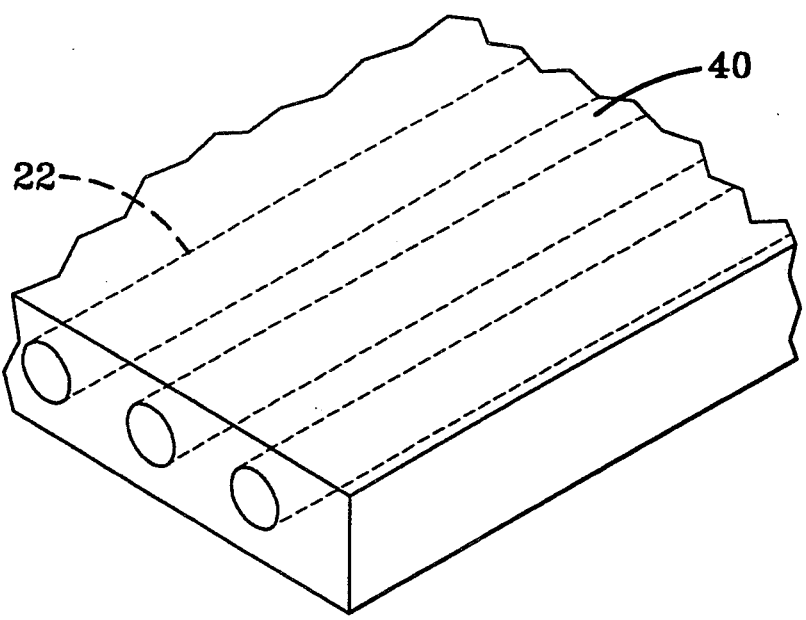
FIG. 3 illustrates individual wires embedded in rubber.
Figure 4:
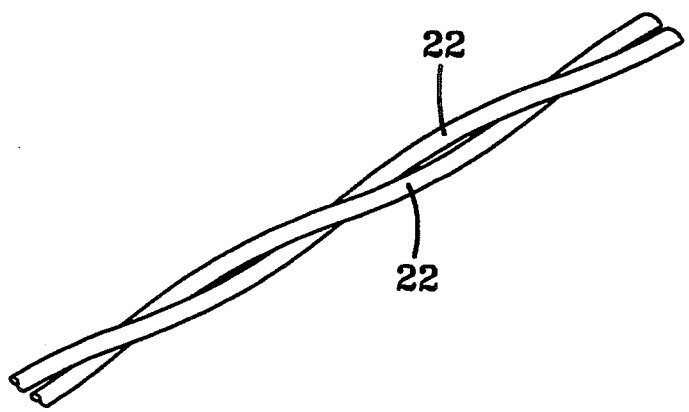
FIG. 4 illustrates two monofilaments twisted together.

With reference to FIG. 3, the wire may be calendered so that the wires 22 are embedded in a layer of rubber 40, independent of one another, or two wires can be twisted together, with a 12 to 25 mm lay length as illustrated in FIG. 4.

As illustrated in FIG. 1A and 1B, in a radial ply tire the wires may be woven or nonwoven, and the nonwoven calendered rubber sheets containing parallel monofilament wire, illustrated in FIG. 3, may substantially cover the carcass plies substantially from bead to bead (FIG. 1B). As will be apparent to those skilled in the art, the wires may be applied from bead to bead in one sheet. In the illustrated embodiment, a first calendered rubber sheet 22b originates substantially at a first bead, radially above the bead, and extends radially under a first sidewall and a first shoulder 23 of the tire and radially over the belts 21 to terminate at a second shoulder of the tire, and a second calendered sheet 22b originates substantially at a second bead, radially above the bead, and extends radially under a second sidewall and the second shoulder and radially over the belts to terminate at the first shoulder of the tire.

With reference to FIG. 2, in a bias ply tire, the monofilament wires 22c may form an angle of 10° to 170° with respect to the equatorial plane of the tire. In the illustrated embodiment, the wires in the first sheet are at an angle of 10° to 80° with respect to the EP preferably 45° and the wires in the second sheet are at an angle of −10° to −80° (which corresponds to 100° to 170°), preferably −45° with respect to the EP. Such independent sheets of calendered monofilament wire are used in applications where the wires tend to move in the building of the tire, such as in bias ply tires, since woven wire will not pantograph to the extent needed in such applications.

Two to four calendered sheets of independent monofilament wire may be placed radially on top of one another in the tire.

In a preferred embodiment, the wires will be formed or combined in an armor type structure so that the wires work together and support each other in the tire structure. The structure provides flexibility as well as strength and penetration resistance. The wire is brass plated, preferably before incorporation into the armor structure. The armor structure may comprise interconnected rings, chain links, woven structures, interlocking springs, or any other such structure known in the prior art.

Figure 5:
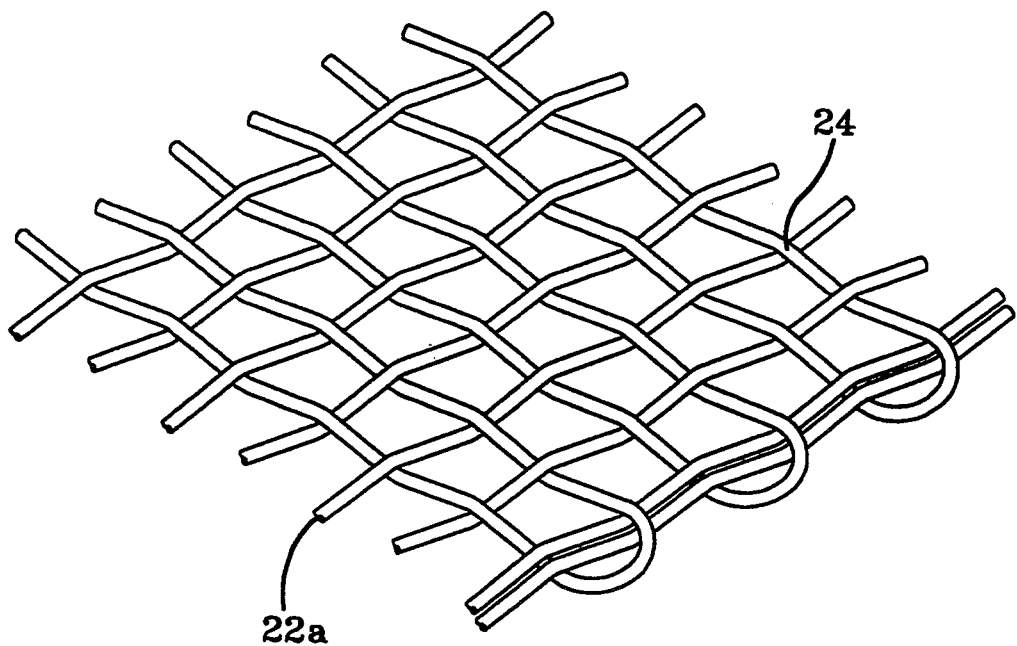
FIG. 5 illustrates a structure for monofilament woven wire that can be used in the tire.

With reference to FIG. 5, in one embodiment, the wire may be woven having wires in a "weft" direction at an angle of about 90° with wires woven in a "warp" direction. Those skilled in the art will recognize that the woven wire structure may also be pantographed such that an acute angle between wires of intersection may be from 30° to 89°. Consequently, an obtuse angle in the pantographed woven structure will be from 91° to 150°.

In a preferred embodiment, the wires will be woven at a 90° angle and placed in the tire construction at substantially a 45° angle with respect to the equatorial plane of the tire. When the tire expands in the mold during the manufacturing process, the woven structure pantographs slightly, making possible the expansion of the wire structure together with the expansion of the tire.

In an alternative embodiment, the intersections 24 of the wires may be fused (see FIG. 5), providing a structured relationship whereby adjacent wires provide support for individual wires, The inherent flexibility of the wires provide a flexibility to the structure as a whole. In the manufacture of a tire with such a structure, an overlap splice may be used, and the structure expands by slipping at the overlap splice during the molding of the tire.

Figure 6:
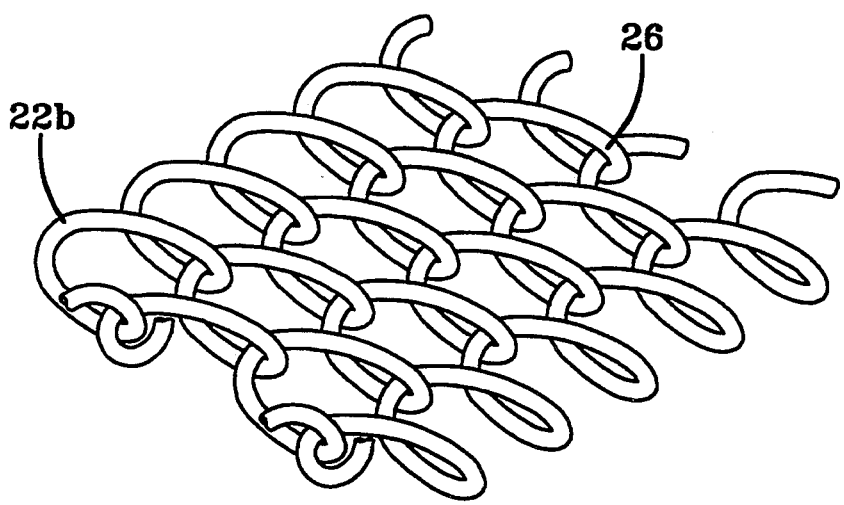
FIG. 6 illustrates a structure for linked springs that can be used in the tire.

With reference now to FIG. 6, wires 22b may be coiled into a spring, and the wires may be interlocked by causing each coil 26 of a spring to have an interlocking relationship with a coil of an adjacent spring. In such a structure, the individual springs move independently of one another, but have a limited range of motion such that the structure as a whole has substantial flexibility within the limited range, but the structure has great strength and resistance to distortion at the limits of the range.

It is preferred that the structure containing the interlocking springs be applied to the tire such that the individual springs have an angle of substantially 45° with the equatorial plane of the tire, and the structure is applied using an overlap splice. The structure will slip at an overlap splice, allowing the expansion needed, during the molding of the tire.

The tires 10 of the invention may be built as is conventional in the art except that the wire structure, for example structure 22a or structure 22b, can be rolled onto the tire in the same manner as a belt ply before application of the tread.

The wire may be rubber coated by calendering prior to application. Alternatively, the wire may be applied to the tire as manufactured, and the rubber of the tread and/or tread base will flow around the wire in the molding of the tire. The brass coating on the wire assures good adhesion between the wire and the rubber of the tread base and/or tread.

While specific embodiments of the invention have been illustrated and described, those skilled in the art will recognize that the invention may be variously modified and practiced without departing from the spirit of the invention. The invention is defined by the following claims.

What is claimed is:

1. A heavy duty pneumatic tire comprising at least a pair of parallel annular beads, at least one carcass ply wrapped around said beads, reinforcement plies disposed radially over said at least one carcass ply in a crown area of the tire, tread disposed radially over said reinforcement plies, and sidewalls disposed between said tread and said beads, the improvement wherein continuous monofilament wires having a diameter of 0.4 to 1.2 mm are disposed in parallel relation to one another in calendered rubber sheets and said calendered rubber sheets are included in or under said tread and sidewalls, and substantially cover said at least one carcass ply substantially from bead to bead while remaining radially above said beads.

2. The tire of claim 1 in which said wires are brass coated steel wires and have a tensile strength of 1300 MPa to 3500 MPa, and wherein said brass coated steel wires have an elongation of 2 to 8%.

3. The tire of claim 1 in which said monofilament wires form an angle of 10° to 170° with respect to the equatorial plane of the tire.

4. The tire of claim 1 wherein two to four of said calendered sheets are placed radially on top of one another in said tire.

5. The tire of claim 4 wherein a first calendered rubber sheets, extends from radially above a first bead radially under a first sidewall and a first shoulder of the tire and radially over said reinforcement plies to terminate at a second shoulder of the tire, and a second calendered sheet extends from radially above a second bead radially under a second sidewall and said second shoulder and radially over said reinforcement plies to terminate at said first shoulder of said tire.

* * * * *